April 11, 1944.   D. N. CROSTHWAIT, JR., ET AL   2,346,560

WINDOW THERMOSTAT

Filed Oct. 24, 1938   3 Sheets-Sheet 1

Inventors
David N. Crosthwait Jr.
and Everett W. Werts
By Barnett & Truman
Attorneys.

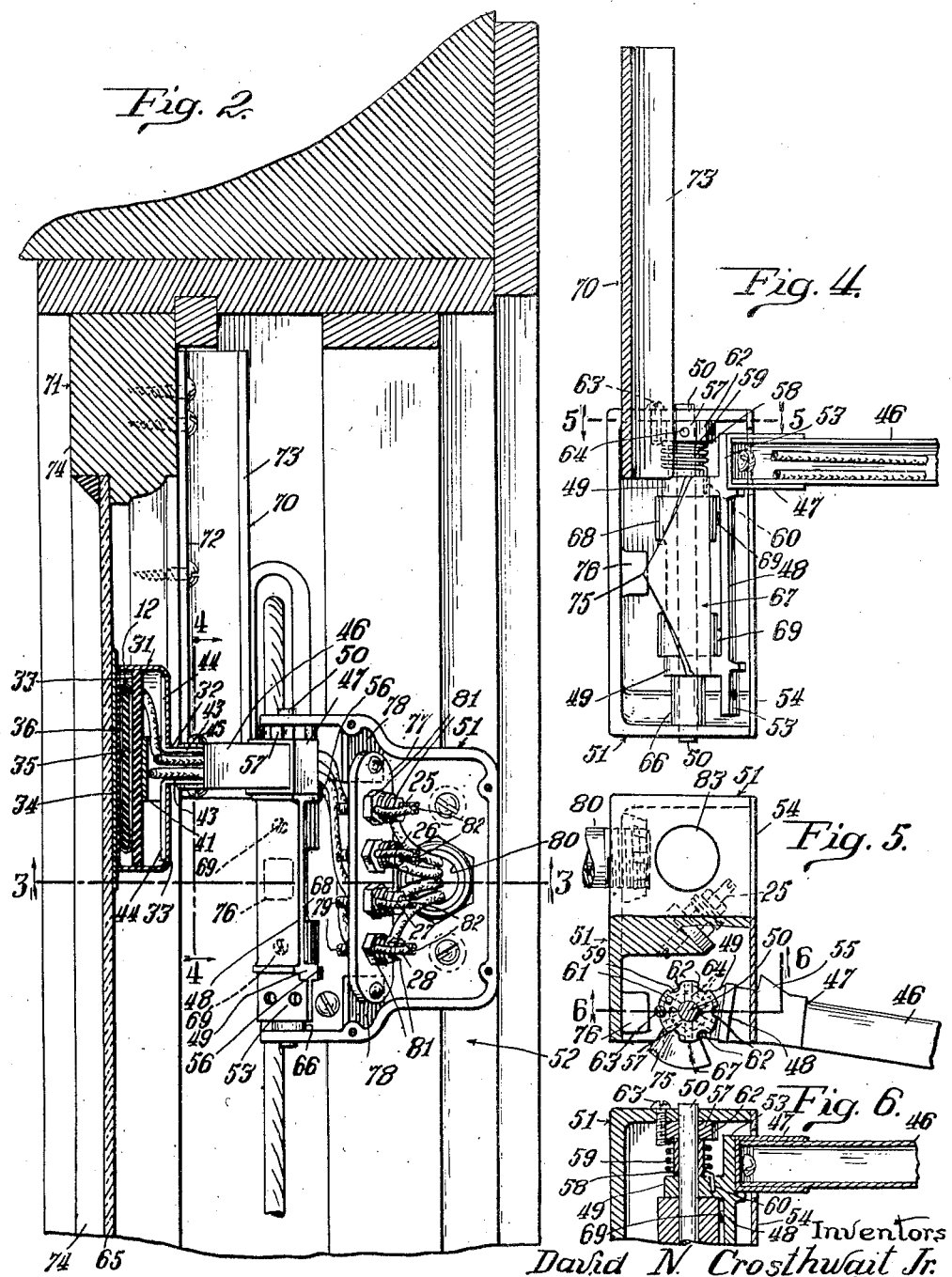

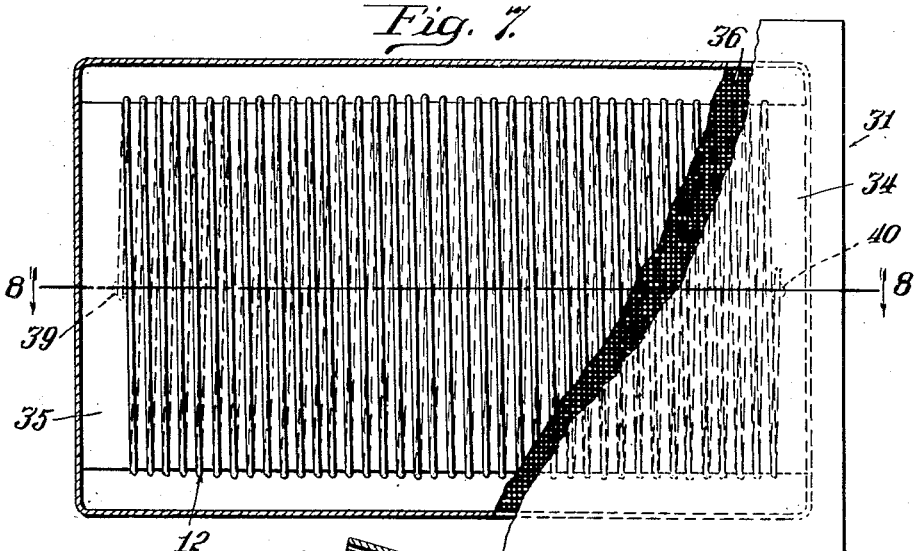
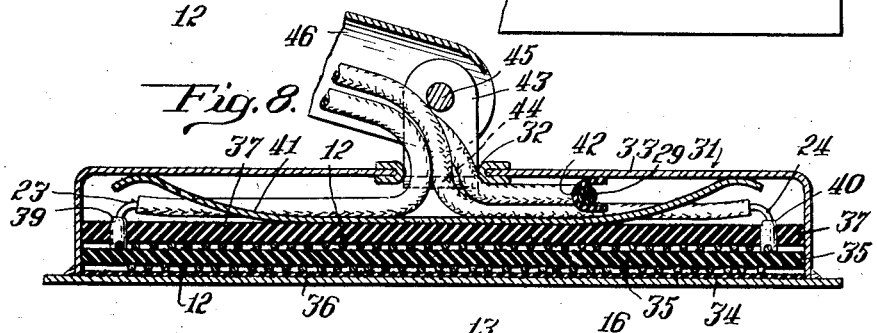
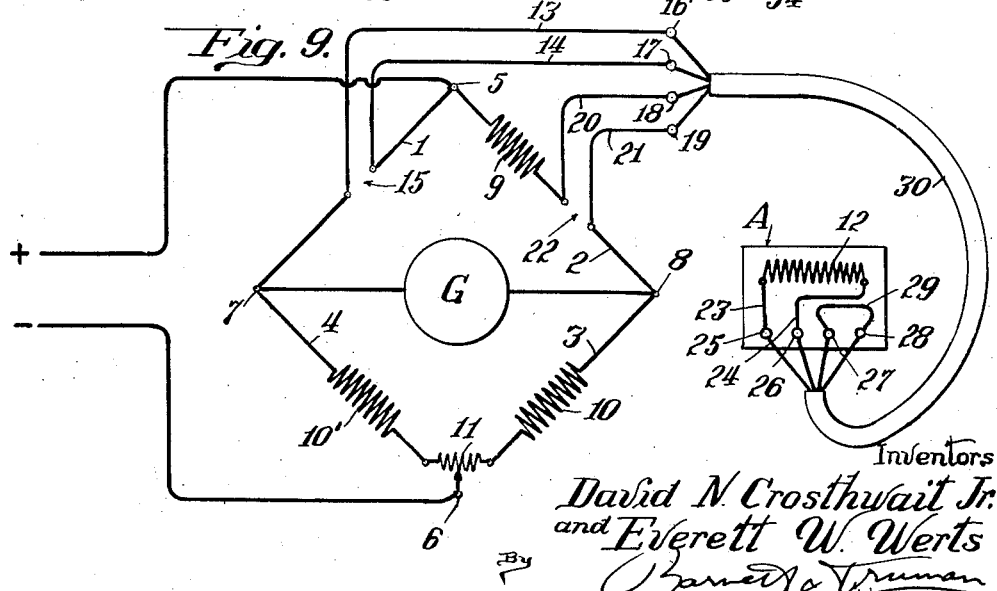
Inventors
David N. Crosthwait Jr.
and Everett W. Werts Patented Apr. 11, 1944

2,346,560

UNITED STATES PATENT OFFICE 2,346,560

WINDOW THERMOSTAT

David N. Crosthwait, Jr., Chicago, Ill., and Everett W. Werts, Michigan City, Ind., assignors to C. A. Dunham Company, Marshalltown, Iowa, a corporation of Iowa Application October 24, 1938, Serial No. 236,825

12 Claims. (Cl. 201—63)

This invention relates to certain new and useful improvements in a window-thermostat, that is a thermostatic device adapted to be positioned in close contact with the inner surface of the glass of an outside window so as to measure the heating requirements within the building as a function of the prevailing outside weather conditions as well as changes in inside temperature.

It is well known that the heat loss from a building, and consequently the heat output from a heating system necessary to maintain the desirable inside temperature, will vary in accordance with changes in the prevailing outside temperature. A change in outside temperature is not immediately effective within the building, and consequently more efficient results are obtained by measuring the temperature changes adjacent an outside wall, or more preferably adjacent the inner surface of a window, the thermostat being shielded to some extent from air temperature changes within the room so as to respond more promptly to outside temperature changes than to inside temperature changes.

The thermostat disclosed in the present example is of the resistance type, operating upon the principle of the variation in the resistance of a metallic conductor in response to temperature changes. This temperature sensitive resistance winding is utilized in a Wheatstone bridge circuit to operate a sensitive galvanometer relay which in turn controls the setting of a motorized valve or other device for establishing the output of a heating system. One approved form of resistance type temperature controlling system in which this present window-thermostat is especially designed for use is disclosed and claimed in the copending application of Crosthwait and Werts, Serial No. 236,824 filed of even date herewith. The control system as a whole, involving the use of this window-thermostat, is disclosed and claimed in said copending application. The present application is restricted to the detailed construction and operation of the improved window-thermostat and certain cooperating elements.

According to the present invention, the temperature sensitive resistance element is mounted within an enclosing casing which shields the element from rapid response to room temperature changes, and is so positioned as to be directly sensitive to temperature changes at the inner surface of the window pane. The thermostat casing is held in yieldable contact with the inner face of the window glass by means of a bracket arm pivotally mounted in a terminal box secured to a portion of the adjacent window frame. The thermostat casing may be easily swung out of the way while the window is being washed, but will be automatically returned to window-engaging position as soon as released. Means are also provided for automatically swinging the thermostat inwardly as the window is raised or lowered in order to avoid engagement with the transversely extending portion of the window sash. In the case of a swinging window, the thermostat assembly will automatically swing with the window, and in all installations the thermostat will be maintained in constant engagement with the window frame insofar as circumstances will permit.

The principal object of this invention is to provide an improved window-thermostat of the type briefly described hereinabove, and disclosed more in detail in the specifications which follow.

Another object is to provide an improved form of resistance type thermostat adapted for direct engagement with the inner surface of a window glass.

Another object is to provide means for automatically supporting the thermostat in yieldable engagement with the inner surface of the window glass.

Another object is to provide improved means for automatically swinging the thermostat into and out of position as the window is raised and lowered.

Other objects and advantages of this invention will be more apparent from the following detail description of one approved form of apparatus constructed and operating according to the principles of this invention.

In the accompanying drawings:

Fig. 2 is a vertical section, taken substantially on the line 2—2 of Fig. 1, and looking in the direction of the plane of the window glass. The cover plate of the terminal box is omitted in this view.

Fig. 4 is a detail vertical section taken substantially on the line 4—4 of Fig. 2.

Fig. 5 is a detail horizontal section, taken substantially on the line 5—5 of Fig. 4.

Fig. 6 is a detail vertical section taken substantially on the line 6—6 of Fig. 5.

Fig. 7 is a plan view of the window engaging pad or casing, looking at the outer or window-engaging side, with a portion of the casing broken away to show the internal assembly.

Fig. 8 is a horizontal section taken substantially on the line 8—8 of Fig. 7.

Fig. 9 is a schematic diagram of the electrical control system.

Figure 1:
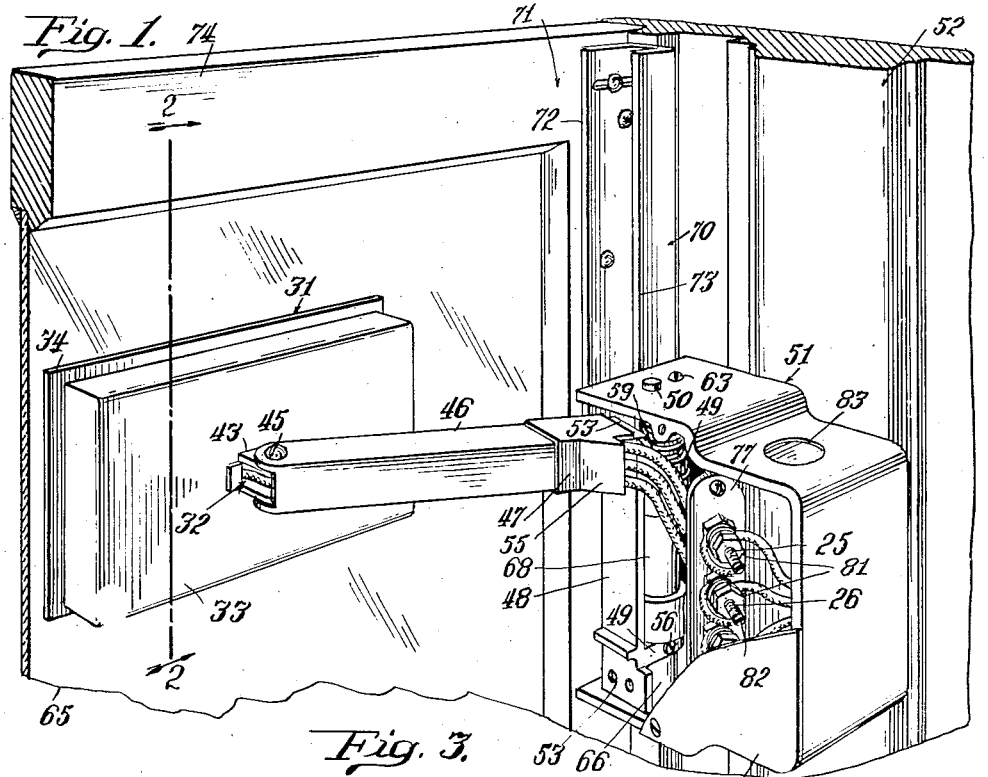
Fig. 1 is a perspective view of the thermostat assembly as mounted on the window, a portion of the cover plate of the terminal box being broken away.
Figure 3:
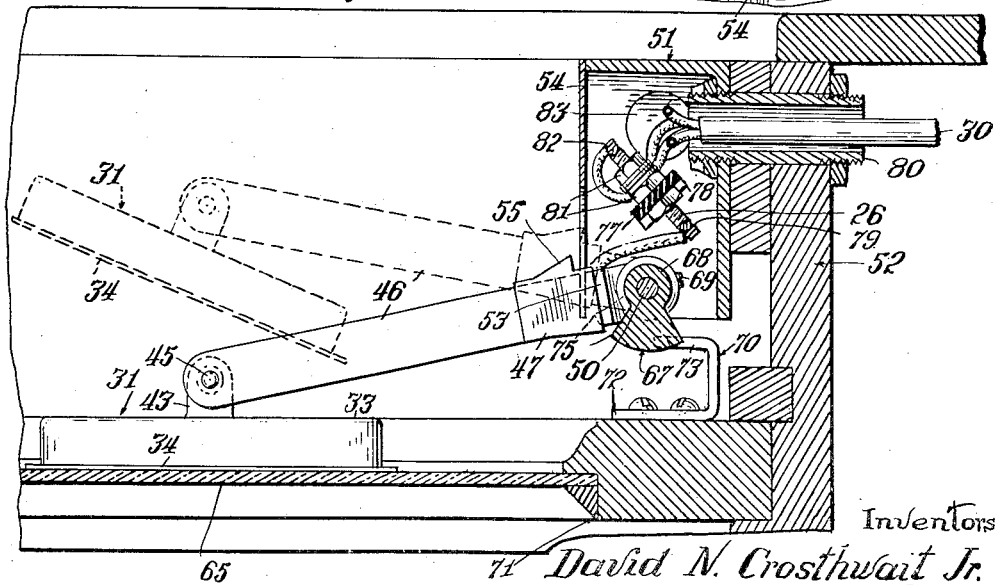
Fig. 3 is a horizontal section, looking upwardly, and taken substantially on the line 3—3 of Fig. 2.

Brief reference will first be made to Fig. 9 which shows schematically a Wheatstone bridge control system, the bridge comprising the four arms 1, 2, 3 and 4, electric power being applied across the bridge terminals 5 and 6, and the galvanometer relay G being connected across the other bridge terminals 7 and 8. Resistances 9, 10 and 10' are connected in the respective bridge arms 2, 3 and 4, and the arms 3 and 4 are connected with terminal 6 through the adjustable resistance 11. The temperature-sensitive resistance 12 of the window-thermostat indicated generally at A is connected in the bridge arm 1. When the bridge is properly balanced for example by adjustment of resistance 11, terminals 7 and 8 will have the same potential and no current will flow through galvanometer G, but if the bridge is thrown out of balance, for example by a change in temperature affecting the resistance 12, a small current will flow through galvanometer G and by means of the cooperating relay mechanism (not here shown) the heating system will be adjusted to compensate for the temperature change registered at window-thermostat A. It will be understood that the bridge control system is only shown schematically in the present application, and will usually be more complicated involving additional bridge arms and adjusting and controlling resistances, as is disclosed and claimed in the copending application Serial No. 236,824 hereinabove referred to.

Since the window-thermostat A will be positioned, in different installations, at various distances from the control panel in which the bridge circuits are located it is necessary to compensate for or balance the resistances and temperature effect thereon of the lead wires extending from the bridge to the temperature sensitive resistance 12 in the window-thermostat A. In the control panel, conductors 13 and 14 extend from the terminals of the gap 15 in arm 1 to a pair of outlet terminals 16 and 17. A second pair of terminals 18 and 19 are connected through conductors 20 and 21 with the terminals of a gap 22 in arm 2. The ends of resistance 12 in the window-thermostat are connected through wires 23 and 24 with outlet terminals 25 and 26. A second pair of outlet terminals 27 and 28 are connected by a loop 29 also located in the thermostat assembly A. The terminals 16, 17, 18 and 19 of the control panel are coded similarly to the terminals 25, 26, 27 and 28 respectively of the thermostatic assembly A, and these two sets of terminals are connected by the four-wire coded cable 30. In this manner the conductor loop connecting resistance 12 in arm 1 of the bridge will be automatically balanced by a similar conductor loop in the arm 2 of the bridge no matter what the distance between the control panel and thermostat may be, and all of the wires of these two loops will be subjected to the same temperature conditions. In this manner this portion of the control bridge will be automatically balanced by the installing electrician, even though the principle of operation of the system is not thoroughly understood by him, and will automatically prevent the electrician from making innovations in the wiring, such as installing jumpers to other points to give a generally equivalent circuit, as is common practice in installing electrical equipment with the object of promoting economy of labor and materials.

The detailed construction and operation of the window-thermostat assembly will now be described, referring more particularly to Figs. 1 to 8 inclusive. The pad or casing 31 in which the thermostat is housed is substantially closed except for a small central opening 32 in the rear wall 33, through which opening the four wire leads extend. The front or outer face of the casing is formed by a thin sheet 34 of copper or other metal of high heat conductivity. Within the pad or casing 31 is mounted the temperature sensitive resistance 12 (Figs. 7 and 8) here shown as wrapped as a flat coil on a sheet of insulation 35. Between the coil 12 and copper sheet 34 is interposed a thin layer 36 of electrical insulating material which preferably offers as little resistance as possible to the transfer of heat therethrough. Back of the resistance coil 12 is mounted a stiff insulating board 37 through which the terminals 39 and 40 at the respective ends of coil 12 project, the inner ends of the conduit wires 23 and 24 being connected to these terminals. A spring or other suitable resilient member 41 is interposed between the rear wall 33 of the casing and the thermostatic assembly hereinabove described, so as to urge the coil 12 forwardly into as close juxtaposition as possible to the window-engaging copper wall 34 of the casing. The end of the balancing loop 29 is held in any suitable manner within the casing, for example by the clip indicated at 42 (Fig. 8).

A pair of similar spaced apart pivot ears 43 project rearwardly through opening 32 in the center of the rear wall 33, these pivot ears being conveniently formed as angle members having lateral extensions 44 soldered or otherwise secured to the inner surface of the rear wall 33 (see Fig. 2). Ears 43 are pivoted on pin 45 within the outer forked end of the swinging supporting arm 46. The holder 47 at the other end of arm 46 is screwed or bolted to one end of the yoke member 48 having ears 49 mounted on the vertical shaft 50 which is journaled in the top and bottom walls of the terminal box or casing 51. This box 51 is screwed or otherwise secured against a portion of the wooden framework 52 at the side of the window casing. It will be noted that the yoke member 48 is provided at each end with a tapped surface 53 to which the holder 47 at the end of arm 46 may be secured. This permits the assembly to be mounted alternatively at either side of the window, and when the terminal box is reversed the arm will be attached to the other end of yoke member 48. The removable and reversible cover plate 54 of terminal box 51 is notched or recessed to permit the arm 46 to swing therethrough, and a guard protection 55 formed on holder 47 is adapted to shield the conduit wires that are housed in the arm as hereinafter described.

The ears 49 of supporting yoke 48 are fixedly secured to vertical shaft 50 by binding screws 56. A spring-adjustment hub 57 is rotatable on shaft 50 between the upper wall of casing 51 and the spacing thimble 58 (see Figs. 4, 5 and 6). A torsion spring 59 is coiled around spacer 58 and is connected at one end to the upper ear 49 and at the other end to the hub 57, as indicated at 60 and 61 respectively. The edge portion of hub 57 is provided with a circumferential series of slots or notches 62, and a holding screw 63 mounted in the upper wall of casing 51 is adapted to engage in a selected one of these notches to hold the hub in fixed position. By first removing screw 63 and then rotating hub 57 by means of a suitable instrument inserted in any one of a series of radial holes 64 in the hub, the tension of spring 59 may be adjusted as desired. It will be understood that this spring tends to swing the supporting yoke 48 and arm 46 in a clockwise direction (as viewed from above in Fig. 1) so as to hold the thermostatic pad yieldably in engagement with the window glass 65. The thermostatic assembly can always be swung inwardly or away from the window against the resistance of spring 59, but spring 59 always tends to return the pad 31 to window engaging position. A hollow cylindrical thimble 66 is positioned about shaft 50 between the lower ear 49 and the bottom of casing 51.

A cam member 67 projecting through the open end of the terminal box adjacent the window sash has a thimble portion 68 mounted on shaft 50 between the ears 49, thimble 68 being secured to the shaft by screws 69. A cam operating rail 70 is mounted on an adjacent portion of window sash 71, this rail preferably being in the form of a channel bar having one flange 72 secured to the sash, the other outwardly spaced flange 73 being positioned to engage the cam 67.

Referring now to the parts as shown in Fig. 1, if the window there shown is moved downwardly the rail 70 will engage cam 67 and swing all of the parts attached to shaft 50 in a counterclockwise direction so that thermostatic pad 31 will be swung inwardly out of the path of the upper sash member 74. If the window is moved far enough downwardly so that rail 70 moves out of engagement wth cam 67, the spring 59 will again tend to swing the assembly in an outward direction, but this movement will be limited by the engagement of the tip 75 of cam 67 with a fixed stop lug 76 provided within casing 51. When the window is again translated upwardly to its closed position, the rail 70 will again engage the double-faced cam 67 so as to swing the thermostatic assembly inwardly to again clear the upper sash member 74, after which the pad will again be moved into engagement with window pane 65 by spring 59. It will thus be seen that the thermostatic assembly will always be held in engagement with the window pane while the window is closed, but will be automatically swung out of position as the window is moved to or from open position.

It may be noted that the supporting yoke 48 for arm 46 is adjustably secured to shaft 50 by screws 56, and similarly the cam 67 is adjustably secured to shaft 50 by screws 69. This permits the angularity of the arm 46 with respect to the window and also with respect to cam 67 to be varied as the distance between the center line of shaft 50 and the inside surface of the window pane varies according to the building construction. In other words, it permits adjustment for variations in the depth of the window sash.

The rail 70 might be hinged so that it could be swung out of the way to permit the lower sash of the window to be more completely raised.

An assembly of this same type can be used in connection with a swinging window, although the cam operating rail 70 is not required in such an installation. If the window swings inwardly the pad 31 will simply be swung back by the window, against the force of spring 59. If the window swings outwardly, the outward swinging movement of the thermostat will be limited by the stop members 75, 76, already described.

A terminal strip 77 is mounted on inwardly projecting ears 78 within casing 51 (see Fig. 2) and the several binding posts 25, 26, 27 and 28 (see also Fig. 9) are mounted in this terminal strip 77. The binding posts are in the form of screws projecting through the strip 77 and held in place by suitable nuts at either side thereof, and the inner ends of these screws are notched at 79 (see Figs. 2 and 3) to receive the ends of four conduit wires leading from the interior of pad 31. The ends of these wires are soldered within notches 79. These wires extend outwardly from pad 31 through opening 32 in the rear thereof, between ears 43, thence through arm 46 to the interior of casing 51 where the wires are secured to the binding posts.

A tubular outlet duct 80 leads from the rear of casing 51 through the window casing 52, and the conduit cable 30 (see Fig. 9) is introduced through this conduit, the ends of the four cable wires being attached to the properly coded terminals 25, 26, 27 and 28. These wires may be held in place by the usual binding nuts 81 (see Fig. 3) and can be permanently soldered in notches 82 in the outer ends of the terminal posts. Alternatively, the cable 30 may be introduced through the top or bottom of casing 51 by punching out one or the other of openings 83 which are partially formed in the casing wall at the time of manufacture.

Temperature control systems heretofore known have utilized a thermostat positioned outside of the building being heated to measure changes in outside temperature. It has also been proposed to locate this thermostat inside the building but against an outside wall thus taking into account the time lag before the outside temperature changes affect the rate of heat loss, but even here the change in rate of heat loss is not accurately timed since the great preponderance of heat loss is usually through the glass of the outside windows. Therefore the positioning of the present improved thermostatic apparatus in engagement with the inner surface of the glass of the window more accurately measures the change in rate of heat loss as a function of change in outside weather conditions. There are other advantages. The thermostat is positioned to respond to changes in sunlight, either direct or reflected from opposite buildings, and this radiant heat of sunlight has an effect on the rate of heat loss quite apart from the actual prevailing outside temperature. Also changes in the direction and velocity of the wind will change the rate of heat loss through the window so as to change the temperature at the inner surface of the window pane even though the outside temperature remains constant. Variations in the humidity of the air will also vary the moisture film on the window so as to affect the temperature reading of the sensitive resistance thermostat.

Furthermore, if every other factor remains the same, the inner surface temperature of the glass will change with changes in temperature within the room and thus affect the temperature responsive resistance element. This device as constructed and applied is affected by the inner surface temperature of the glass promptly in response to changes in outside temperature and other weather conditions, and also at a slower rate, by the temperature of the room itself.

As set forth in detail in the copending application of the same inventors, Serial No. 236,824 hereinabove referred to, one use of a window-thermostat of this type is to cooperate with other thermostats which respond to changes in the heat-output of the heating system to keep the heat-output between certain minimum and maximum limits, said limits changing with changes in the outside temperature. Additional control is effected by a thermostat or thermostats responsive to the temperature of the air within the room. Assuming, arbitrarily and simply by way of example, that an inside or room temperature of 70° is to be maintained and that the outside temperature is 25°, the temperature at the inner surface of the window pane may be 45° and the window thermostat, responding to this temperature, will limit the heat-output of the heating system to the desired maximum. As the outside temperature falls or rises, this maximum increases or decreases. Now, assuming that the outside temperature remains substantially constant at 25° but the room temperature is permitted to fall considerably for a protracted period of time (for example to 60° during night operation) then the temperature at the inner surface of the window-pane will fall, for example to 40°. The window thermostat will eventually respond to this temperature and thus increase temporarily the permitted maximum heat output so that the room can be more rapidly brought back to the desired 70° temperature when desired. In this manner, while the window-thermostat is directly and promptly responsive to changes in outside temperature to control the heat-output, it is also self-compensating in response to prolonged inside temperature changes.

We claim:

1. A thermostatic device designed to function in a system for controlling the temperature of a building by responding to temperature changes adjacent the inner surface of an outside window pane as a function of outside weather conditions and room temperature, comprising a substantially closed casing, means mounted on a fixed structure adjacent the window for supporting the casing independently of the window but with one heat transmitting side of the casing held yieldably against the inner surface of the glass of the window, a means adapted to vary an electric current in response to temperature changes and supported within the casing adjacent the heat-transmitting side thereof, and circuit wires leading from the temperature-responsive means and carried by the supporting means.

2. A thermostatic device designed to function in a system for controlling the temperature of a building by responding to temperature changes adjacent the inner surface of an outside window pane as a function of outside weather conditions and room temperature, comprising a substantially closed casing, a temperature responsive means supported within the casing in close relation to one heat-transmitting side thereof, and means for supporting the casing with said heat-transmitting side against the inner surface of the glass of a window, said supporting means comprising a bracket member mounted on a fixed structure adjacent the window, an arm pivotally supporting the casing at one end and pivotally mounted in the bracket at the other end, and a spring for swinging the arm in a direction to yieldably urge the casing toward the window glass.

3. A thermostatic device designed to function in a system for controlling the temperature of a building by measuring the temperature adjacent the inner surface of an outside window pane as a function of outside weather conditions and room temperature, comprising a substantially closed casing, a temperature responsive means supported within the casing in close relation to one heat-transmitting side thereof, and means for supporting the casing with said heat-transmitting side against the inner surface of the glass of a window, said supporting means comprising a bracket member mounted on a fixed structure adjacent the window, an arm pivotally supporting the casing at one end and pivotally mounted in the bracket at the other end, a spring for swinging the arm in a direction to yieldably urge the casing toward the window glass, and cam mechanism associated with the arm and an adjacent portion of the window sash respectively so as to swing the casing out of the path of the sash as the window is translated to open or closed position.

4. A thermostatic device designed to function in a system for controlling the temperature of a building by measuring the temperature adjacent the inner surface of an outside window pane as a function of outside weather conditions and room temperature, comprising a substantially closed casing having a heat-transmitting side, a temperature responsive means supported within the casing in close relation to the heat-transmitting side, and means for supporting the casing with the heat-transmitting side against the inner surface of the glass of a window, said supporting means comprising a bracket member mounted on a fixed structure adjacent the window, an arm pivotally supporting the casing at one end and pivotally mounted in the bracket at the other end, a spring for swinging the arm in a direction to yieldably urge the casing toward the window glass, a cam associated with the end of the arm that is pivoted in the bracket, and a deflector rail secured to the window sash and positioned to engage the cam and swing the casing out of the path of the sash as the window is translated to open or closed position.

5. A thermostatic device designed to function in a system for controlling the temperature of a building by measuring the temperature adjacent the inner surface of an outside window pane as a function of outside weather conditions and room temperature, comprising a substantially closed casing having a heat-transmitting side, a temperature responsive means supported within the casing adjacent the heat-transmitting side, and means for supporting the casing with the heat-transmitting side adjacent the inner surface of the glass of a window, said supporting means comprising a bracket member mounted on a fixed structure adjacent the window, a supporting shaft pivotally mounted in the bracket, a cam member carried by the shaft, an arm pivotally supporting the casing at one end and attached to the shaft at the other end, the cam and arm being so secured to the shaft that the angular relation of the arm and cam can be adjusted, a spring for swinging the arm in a direction to yieldably urge the casing toward the window glass, and a deflector rail secured to the window sash and positioned to engage the cam and swing the casing out of the path of the sash as the window is translated to open or closed position.

6. A thermostatic device designed to function in a system for controlling the temperature of a building by measuring the temperature adjacent the inner surface of an outside window pane as a function of outside weather conditions and room temperature, comprising a substantially closed casing, a means responsive to small temperature changes to vary an electric current, said means being positioned within the casing in close relation to one heat-transmitting side thereof, a terminal box mounted on a fixed structure adjacent the side of a window, an arm pivotally supporting the casing at one end and pivotally mounted in the terminal box at the other end, circuit wires leading from the casing through the arm into the terminal box, and a spring in the box associated with the pivoted end of the arm for swinging the arm and casing to urge said heat-transmitting side of the casing into engagement with the inner surface of the glass of the window.

7. A thermostatic device designed to function in a system for controlling the temperature of a building by measuring the temperature adjacent the inner surface of an outside window pane as a function of outside weather conditions and room temperature, comprising a substantially closed casing, a means responsive to small temperature changes to vary an electric current, said means being positioned within the casing adjacent one heat-transmitting side thereof, a terminal box mounted on a fixed structure adjacent the side of a window, an arm pivotally supporting the casing at one end and pivotally mounted in the terminal box at the other end, circuit wires leading from the casing through the arm into the terminal box, a spring in the box associated with the pivoted end of the arm for swinging the arm and casing to urge said heat-transmitting side of the casing into engagement with the inner surface of the glass of the window, a cam associated with the end of the arm that is pivoted within the box, and a deflector rail secured to the window sash and positioned to engage the cam and swing the casing out of the path of the sash as the window is translated to open or closed position.

8. A thermostatic device designed to function in a system for controlling the temperature of a building by measuring the temperature adjacent the inner surface of an outside window pane as a function of outside weather conditions and room temperature, comprising a substantially closed casing, a means responsive to small temperature changes to vary an electric current, said means being positioned within the casing adjacent one heat-transmitting side thereof, a terminal box mounted on a fixed structure adjacent the side of a window, an arm pivotally supporting the casing at one end and pivotally mounted in the terminal box at the other end, circuit wires leading from the casing through the arm into the terminal box, a spring in the box associated with the pivoted end of the arm for swinging the arm and casing to urge said heat-transmitting side of the casing into engagement with the inner surface of the glass of the window, four terminals with the box to two of which the outer ends of the circuit wires are connected, and a wire loop for balancing the resistance of the circuit wires having its looped end within the casing, and extending through the arm with its outer ends connected to the other pair of terminals.

9. A thermostatic device designed to function in a system for controlling the temperature of a building by measuring the temperature adjacent the inner surface of an outside window pane as a function of outside weather conditions and room temperature comprising a substantially closed casing having one flat side formed of thin heat-transmitting metal, means for supporting the casing with said heat-transmitting side held yieldably in engagement with the inner surface of the glass of a window, an electric resistance element that varies its resistance in response to small temperature changes supported within the casing, resilient means within the casing for urging the resistance element against the inner surface of the flat heat-transmitting side, and circuit wires leading from the resistance element.

10. A thermostatic device designed to function in a system for controlling the temperature of a building by measuring the temperature adjacent the inner surface of an outside window pane as a function of outside weather conditions and room temperature comprising a substantially closed casing having one flat side formed of thin heat-transmitting metal, means for supporting the casing with said heat-transmitting side held yieldably in engagement with the inner surface of the glass of a window, and a temperature responsive assembly supported within the casing and comprising a flattened coil of resistance wire, and electric-insulating material enclosing said coil, a resilient member interposed between the rear of the assembly and the rear of the casing so as to urge the assembly against the inner surface of the front heat-transmitting side, and circuit wires leading from the ends of the coil through the casing.

11. A thermostatic device designed to function in a system for controlling the temperature of a building by measuring the temperature adjacent the inner surface of an outside window pane as a function of outside weather conditions and room temperature, comprising a substantially closed casing, a temperature responsive means supported within the casing adjacent one heat-transmitting side thereof, and means for supporting the casing with said heat-transmitting side against the inner surface of the glass of a window, said supporting means comprising a bracket member mounted on a fixed structure adjacent the window, an arm pivotally supporting the casing at one end and pivotally mounted in the bracket at the other end, a spring for swinging the arm in a direction to yieldably urge the casing toward the window glass, a cam associated with the end of the arm that is pivoted in the bracket, a deflector rail secured to the window sash and positioned to engage the cam and swing the casing out of the path of the sash as the window is translated to open or closed position, and a stop for limiting the outward movement of the casing when the window is open.

12. A thermostat device designed to function in a system for controlling the temperature of a building by responding to temperature changes adjacent the inner surface of an outside window pane as a function of outside weather conditions and room temperature, comprising a substantially closed casing, means mounted on a structure adjacent the window pane for supporting the casing independently of the window pane but with one heat transmitting side of the casing held yieldably against the inner surface of the glass window pane, a means adapted to vary an electric current in response to temperature changes and supported within the casing in close relation to the heat-transmitting side thereof, and circuit wires leading from the temperature-responsive means.

DAVID N. CROSTHWAIT, Jr.
EVERETT W. WERTS.

CERTIFICATE OF CORRECTION.

Patent No. 2,346,560. April 11, 1944.

DAVID N. CROSTHWAIT, JR., ET AL.

It is hereby certified that error appears in the printed specification of the above numbered patent requiring correction as follows: Page 5, first column, line 65, claim 8, for "with" read --within--; and that the said Letters Patent should be read with this correction therein that the same may conform to the record of the case in the Patent Office.

Signed and sealed this 30th day of May, A. D. 1944.

Leslie Frazer

(Seal) Acting Commissioner of Patents.